Nov. 1, 1949            A. A. POLLOCK            2,486,875
COMMUTATOR FOR DYNAMOELECTRIC MACHINES
AND METHOD OF MAKING THE SAME

Filed July 18, 1947            2 Sheets-Sheet 1

Inventor:
Alan A. Pollock,
by    *Browell S. Mack*
His Attorney.

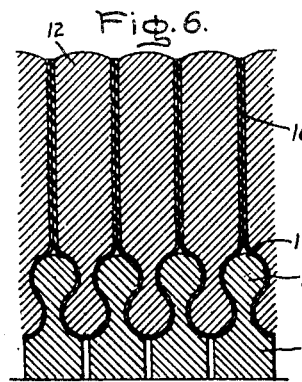
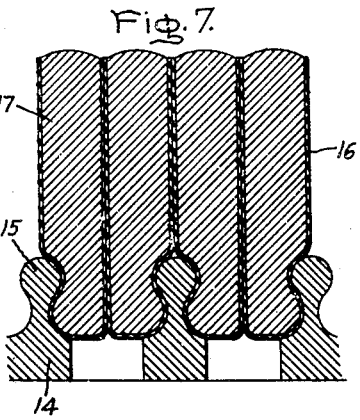
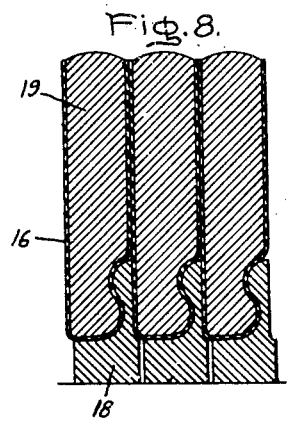
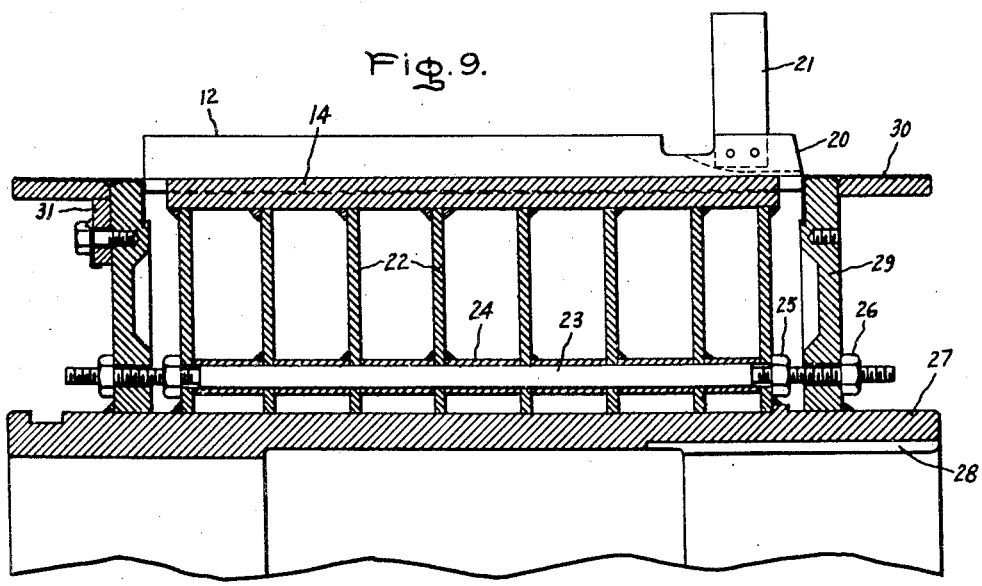
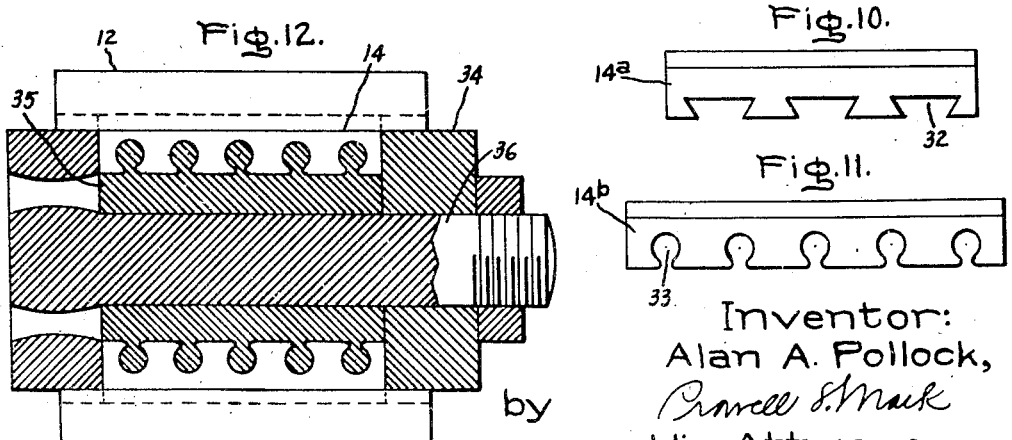
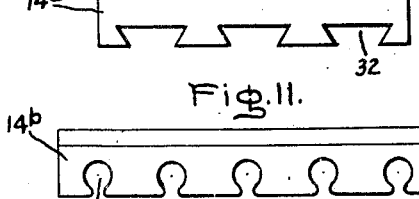

Patented Nov. 1, 1949

2,486,875

UNITED STATES PATENT OFFICE 2,486,875

COMMUTATOR FOR DYNAMOELECTRIC MACHINES AND METHOD OF MAKING THE SAME

Alan A. Pollock, Leamington Spa, England, assignor to General Electric Company, a corporation of New York Application July 18, 1947, Serial No. 761,934
In Great Britain October 30, 1945

Section 1, Public Law 690, August 8, 1946
Patent expires October 30, 1965

14 Claims. (Cl. 171—321)

My invention relates to improvements in commutators for dynamoelectric machine and to methods for making the same.

In making a commutator for a dynamoelectric machine such as a motor or generator, a general practice has been to provide the commutator segments with a V-shaped groove in their ends. The segments, mutually insulated from each other, are then assembled in the form of a cylinder. In the final assembly the cylinder so formed is gripped by two clamping rings having projecting V-shaped tongues which enter the V-shaped grooves in the segments. The rings are either made of an insulating material or are separated from the copper commutator segments by a layer of insulation. This conventional method involves a large number of parts and is not entirely satisfactory because the mica, or other insulating material, does not always firmly hold in place the individual segments. With such a construction, the maximum length of a commutator for a given speed of operation is limited by the maximum allowable deflection of the segments under the action of centrifugal force and by the allowable stress in the tips of the V-shaped clamping rings. In addition, since the copper segments and the steel shaft have different coefficients of thermal-expansion, allowance must be made to take care of axial expansion due to change of temperature and this introduces difficulties which increase with the axial length of the commutator segments. This is an additional disadvantage that with conventional constructions the overall length of the commutator assembly requires a large space be provided for it.

An object of my invention is to provide an improved commutator construction and method of making the same which is economical of material and is not subject to the limitations hitherto involved when either high peripherial speed or a commutator of relatively long axial length is desired.

Figure 2:
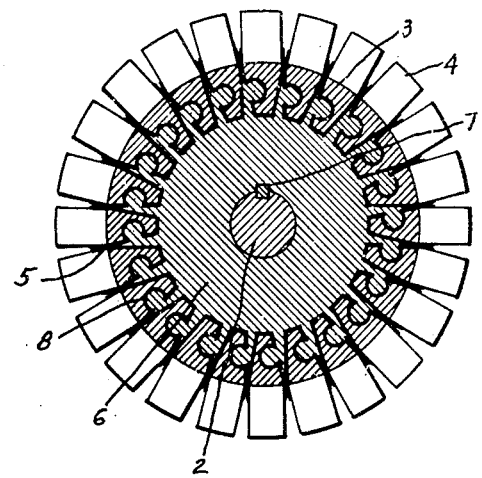
Figure 3:
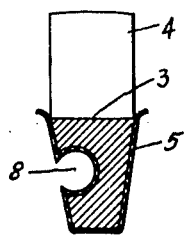

The means employed in the structural embodiments of my invention herein illustrated and described consists of a commutator assembly made up of commutator segments each of which is shaped to provide on one or both of its inner faces, a longitudinal recess which interfits and interlocks with complementary projections adjacent the outer edge of one or more retaining members secured directly or indirectly to the shaft. Suitable insulation is provided to insulate the segments from each other and from the retaining member or members. Other aspects of the invention will appear from consideration of the following description taken in connection with the accompanying drawing in which Fig. 1 is a sectional view showing the assembly of a completed commutator adapted to be used in a relatively small dynamoelectric machine, Fig. 2 is a cross sectional view of the same commutator taken on the line 2—2 of Fig. 1, Fig. 3 is a detailed cross sectional view of one of the commutator segments used in the embodiment illustrated in Figs. 1 and 2, Fig. 4 and Fig. 5 are cross sectional views of commutator segments which are modifications of those shown in Figs. 1, 2 and 3, Fig. 6 is a cross sectional view showing an assembly of commutator segments and retaining members with interposed insulation adapted to be used in a relatively large dynamoelectric machine, Figs. 7 and 8 are cross sectional views showing alternative arrangements of segments and retaining members for use in a relatively large machine, Fig. 9 is a longitudinal section through half of a completed commutator constructed with an assembly of segments and retaining members such as shown in Fig. 6, Figs. 10 and 11 are longitudinal elevations showing alternative constructions for retaining members such as are shown in Fig. 6 but for an intermediate sized machine, and Fig. 12 shows retaining members and segments placed in a mold into which has been cast retaining metal 35 for such an intermediate sized commutator construction.

Figure 1:
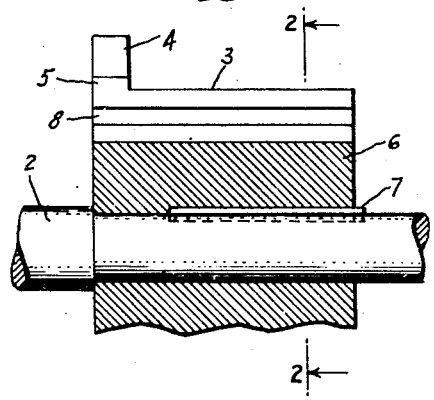

I have shown, in Fig. 1, my invention applied to a commutator for a small dynamoelectric machine having a shaft 2 adapted to drive, or be driven by, the principal rotatable member of the machine (not shown). The copper commutator segments 3 are provided with ears 4 adapted to have fastened thereto, in any conventional manner, the armature conductors (not shown). The segments are each partially surrounded by a thin layer of insulating material 5 and are held in place by a metallic shell 6 which is cast into the spaces between the inner edges of the segments. The retaining member or metallic shell 6 is secured to a shaft 2 by a key 7 so as to be rotatable therewith. Each segment is provided with a longitudinally extending anchoring recess 8 into which the insulating material 5 extends. Complementary projections on the retaining member shell interfit and interlock with these recesses although insulation is interposed between these projections and the segments. This is shown more clearly in Fig. 2 which is a cross sectional view taken on the line 2—2 of Fig. 1. A typical segment 3 and its insulating wrapping 5 fitting around the segments and into the recesses 8 are shown in more detail in the enlarged cross sectional view of Fig. 3.

Figure 4:
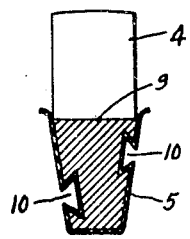

In Fig. 4 I have shown a different form of commutator segment 9 in which anchoring recesses 10 are provided on each inner face of the segment. Again a thin layer of insulation 5 is used to surround that part of the segment, including the recesses, which would otherwise be exposed to the cast metal shell 6.

Figure 5:
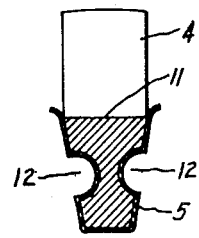

In Fig. 5 I have shown a still different form of copper segment 11 provided with a recess 12 on each of its inner faces. When segments such as that shown by Fig. 5 are placed side by side, the recesses in opposed faces of adjacent segments provide a roughly cylindrical recess which is occupied, in the completed assembly, by a bulbous head on the cast metal shell.

In Fig. 6 I have shown a cross sectional detail for a type of construction preferred for a commutator for a large dynamoelectric machine. The commutator segments 12 are in the usual form of strips of copper made slightly wedge shaped in cross section. Longitudinally extending recesses 13 are formed on both inner faces of the segments. The recesses 13 are shaped to interfit and interlock with the outer ends of the preformed retaining members 14, the retaining members being provided with complementary projections 15 adjacent their outer edges so that the projections on the retaining members may interlock and interfit with the recesses provided in the segments. Before assembly of the segments and retaining members in the manner shown in Fig. 6, the segments are provided with a coating of insulation 16.

An alternative arrangement allowing a greater number of segments is shown in Fig. 7, in which the retaining members 14 are provided between alternate segments 17, instead of between adjacent segments, the segments 17 being formed with recesses on only one innerface of each segment.

In the alternative arrangement shown in Fig. 8 retaining members 18 are provided between adjacent segments 19 which are assembled with their recesses facing in the same direction around the periphery of the commutator. The arrangements of Figs. 7 and 8 allow a greater neck thickness in the copper segments as does the arrangement shown in Fig. 3.

With any of the arrangements, the necks which join the heads to the rest of the shell 6, of Figs. 1 and 2, or to the rest of the retaining members 14 or 18 of Figs. 6, 7 and 8, are allowed to emerge between adjacent edges of the segments. Then, provided the segments are held closely together, centrifugal force is taken by the retaining member (or members) which extends substantially throughout the length of the segments.

With the embodiment shown in Figs. 6, 7 and 8, the retaining members must be in some manner secured directly or indirectly to the shaft of the machine. In Fig. 9, I have shown one preferred way in which the retaining members can be so secured with assurance that there will be no radial outward movement of the commutator segments. In Fig. 9 the commutator segments 12 of Fig. 6, are shown slotted at 20 to receive the segment ears 21. The segments 12 are secured to the retaining members 14 in the same manner as shown in Fig. 6 and the retaining members are in turn secured by welding to a number of spaced annular rings 22. These rings are mounted on a sleeve 23 and are held in proper spaced relationship by the distance tubes 24 and nuts 25 and 26 which threadedly engage rod 23. The annular discs 22 are shrunk onto the sleeve 27 which is adapted to receive the shaft (not shown) of the dynamoelectric machine, as well as a locking key in the keyway 28. End flanges 29 are welded on to the sleeve 27 to yieldingly restrain the commutator segments against axial movement while, at the same time, allowing some freedom for thermal expansion by deflection of these flanges. A layer of insulation 30 is provided between the segments and each end flange and extends a suitable distance to provide creepage insulation. At the time the commutator receives its final external machining, it may be desirable to add balancing weights such as that shown at 31.

While the construction illustrated with reference to Fig. 9 is suitable for the building of very large commutators, it is not so applicable to somewhat smaller commutators which I will designate as those for intermediate sized machines where the inside diameter makes the space for welding too restricted. In Figs. 10 and 11 I have shown an alternative means by which the retaining members 14a and 14b (similar to retaining member 14 of Fig. 6) may be, prior to their assembly with their segments, provided with circumferentially extending notches 32 or 33 in their inner edges. In order to secure these retaining segments against outward radial movement, the assembly is inserted into a suitable mold 34, as shown in Fig. 12, and metal 35 is cast into the space within the projecting ends of the segments to form an integral sleeve which enters the notches in the retaining members, thus, when the metal solidifies, resisting any outward movement thereof. A circular core 36 may be used to facilitate final machining of the bore to receive the shaft of the dynamoelectric machine.

With any of the embodiments herein described and illustrated in Figs. 1 through 12, it is necessary to insulate adjacent segments from each other and from the retaining member or members. To do this, I wrap the segments before assembly with a sheet like insulating material. Any conventional sheet insulating material may be used such as mica sheets or a woven cloth (for instance, glass cloth) impregnated with a heat-convertible (i. e., potentially thermosetting) or polymerized resinous insulation. Examples of heat-convertible resinous insulation which may be employed are phenol-formaldehyde resins, melamine-formaldehyde resins, hydrocarbon substituted polysiloxanes (commonly known as "silicone resins") etc. Examples of polymerized resinous insulation are polystyrene, polyvinyl acetate, polyvinyl chloride, polyvinylidene chloride, polyethylene, etc.

The sheet material must be of sufficient flexibility to follow the contours of the longitudinal recesses. I find that considerable flexibility of material may be obtained by wrapping the segments with a material impregnated or coated with one of the above mentioned potentially thermosetting insulations which is only partially cured, and then completing the curing to the infusible, insoluble state after the sheet material has been forced into proper contact with the surfaces of the recesses. I have also found it desirable, in order to assure close contact between the insulation and the walls of the recesses of the segments, to insert removable rods which force the insulation into close contact with the walls. Other alternatives are to mould the insulation in place on the segments or, with the embodiments of Figs. 1—5 to use a pressure casting process so that the molten metal under pressure will force the insulation into close contact with the copper segments.

After the individual segments have been insulated they are assembled in a cylindrical formation. I prefer that the assembly take place in a cylindrical jig of a diameter such as to allow for the lack of compression initially existing between the segments and the insulation. After the assembly is completed, the jig is collapsed and the assembled segments forced into a smaller diameter to compress the segments into an arch bound structure, after which the curing of the insulation may conveniently take place.

With the construction for small commutators (Figs. 1 and 2), it seems desirable to first compress the segments circumferentially so as to reduce the diameter of the assembly, then cure the insulation and then cast the molten metal into the compressed assembled segments so that the metal flows into the recesses of the segments and, on cooling, exerts a radial inward force which holds the segments in the circumferentially compressed state.

The insulation material and the metal employed for casting must be so selected that the molten metal will not injuriously affect the insulation. I have found that, with the examples of heat-convertible insulations mentioned above, a zinc alloy having sufficiently low melting point so as not to affect the insulation will still be capable of withstanding the centrifugal forces encountered during operation of these smaller constructions. Of course, substances such as bismuth, which expand on solidification, are to be avoided in the metal employed for casting since the metal must have the characteristic, common to most metals, of contracting as it passes from the molten to a solid state.

Preferably, a center core is placed into the assembly prior to the introduction of molten metal to simplify machining the ultimate bore for the shaft.

After the small commutator is completely assembled, as above described, it is "turned down" in the conventional manner both to assure a circumferential curve on the brush contacting surfaces of the individual segments and to cut away the insulation flaps which may extend radially outward beyond said brush contacting surfaces.

To obtain the full advantages of my invention, there must be a sliding fit between either the solidified cast metal and the insulation, or between the insulation wrappings and the individual copper segments to provide for the differential existing between the coefficient of expansion of the copper segments, on the one hand, and that of the steel shaft and the zinc alloy shell on the other.

When the small commutator assembly is completed, the circumferential pressure exerted by the segments and insulation and the radially inward force exerted by the metal shell retaining member (which has contracted as it cooled) serves to maintain the segments in close contact and prevent outward radial movement which would otherwise release the pressure between segments, yet a fit is provided which will allow relative movement between segments and insulation due to the relatively large forces exerted by thermal expansions.

With the construction for large or intermediate size commutators as indicated by Figs. 6—12, inclusive, the segments (suitably provided with insulation in one of the ways already described) are assembled with the retaining members in cylindrical formation and are then compressed circumferentially in order to reduce the overall diameter of the assembly. The retaining members are then welded, or otherwise suitably secured, to the shaft of the rotor of the dynamoelectric machine or to intermediate members which are in turn secured to the shaft. There is thus exerted by the retaining members a radial inward force which, owing to the interlocking of the retaining members with the commutator segments, maintains the circumferential pressure between the segments and prevents any outward movement of the segments which would be required to permit disengagement of the segments from the retaining members.

During manufacture, the assembled segments and retaining members are clamped tightly together by using a conventional commutator assembly jig or by clamps known to the art being placed around the assembly and tightened to the required extent to compress the segments, interposed insulation, and retaining members, or by a combination of jig and clamps so that, in the ultimate operation of the dynamoelectric machine commutator, centrifugal force is taken by the retaining members substantially throughout the length of the segments. After the compression the insulation may be cured. The retaining members are then secured to the shaft, preferably indirectly by welding as described in connection with Fig. 9, or by casting as described in connection with Figs. 10–12 inclusive. With either of these constructions the retaining members, and through them the commutator segments, are held radially and circumferentially uniformly along the whole length of the segments while, at the same time, differential expansion as between segments and retaining members is permitted by reason of the fact that the segments are not rigidly secured to the retaining members, and that the ends of the segments are not restricted by clamping rings as in the hitherto conventional constructions.

There is thus provided a device of the character described capable of meeting the objects hereinabove set forth.

While I have illustrated and described particular embodiments of my invention, modifications thereof will occur to those skilled in the art. I desire it to be understood, therefore, that my invention is not to be limited to the particular arrangements and methods disclosed, and I intend in the appended claims to cover all modifications which do not depart from the spirit and scope of my invention.

What I claim as new and desire to secure by Letters Patent of the United States is:

1. A commutator for a dynamoelectric machine having copper commutator segments, each of said segments being provided with a longitudinally extending recess on at least one inner face thereof, an insulation wrapping extending around the sides and bottom of each of said segments and into and around the walls of the associated recess, and at least one metallic retaining member located generally within said segments and provided with at least one projection adjacent its outer edge, said projection interlocking with the longitudinal recess in one of said segments, with each of said insulation wrappings forming an insulation barrier between the associated retaining member and the associated segment as well as between said segment and adjacent segments, and with said commutator having the characteristics of such a member when made by first assembling the segments side by side in a cylindrical formation and then securing them to a more central mass arranged to be rotatable with a shaft of said dynamoelectric machine.

2. A commutator for a dynamoelectric machine having commutator segments, each of said segments being provided with a longitudinal recess on each of its two inner faces, an insulation wrapping extending around the longitudinal sides and bottom of each segment and into and around the walls of said recesses, and retaining means including at least one retaining member having a projection adjacent the outer edge of said retaining member, said projection being located between adjacent segments and interfitting and interlocking with certain of said recesses, said insulation being interposed between said segments and said retaining member and having the characteristics of an insulating material cured in situ, and said commutator having the characteristics of such a member when made by first assembling insulated segments in circular form within a jig, then compressing the assembly, then securing the segments to a more central mass, and finally removing the jig.

3. A commutator for a dynamoelectric machine having a plurality of commutator segments each shaped to provide a longitudinally extending recess on one of its inner faces, a cast metallic shell adapted to be secured to the shaft of said dynamoelectric machine and having complementary projections which interfit and interlock with said longitudinally extending recesses, and insulation interposed between said commutator segments and between said segments and shell, said commutator having the characteristics of such a member when made by first assembling said segments together with said insulation in a cylindrical formation and then introducing molten metal in the center of said assembly to form said cast metallic shell.

4. A commutator for a dynamoelectric machine having a plurality of commutator segments each shaped to provide a longitudinally extending recess on each of its two inner faces, a cast metal shell adapted to be secured to the shaft of said dynamoelectric machine and having complementary projections which interfit and interlock with said longitudinally extending recesses, and insulation interposed between said commutator segments and between said segments and said shell, said commutator having the characteristics of such a member when made by first assembling said segments together with said insulation in a cylindrical formation and then introducing molten metal in the center of said assembly to form said cast metallic shell, and said insulation having the properties characteristic of such material when cured in situ.

5. In a dynamoelectric machine a rotatable shaft member, a cast metallic commutator shell member, cooperating keyways in said members, a key fitting in said keyways, a plurality of axially extending commutator segments having axially extending recesses in at least one inner face of each segment and sheets of totally cured resinous insulation surrounding all except the brush and ear surfaces of each of said segments and following the contours of said recesses, said cast metallic shell member being in intimate engagement with said recesses and locking said segments against radial motion and in a circumferentially compressed state while at the same time allowing said segments to slide in an axial direction with respect to said shell member to compensate for differential expansion due to temperature changes.

6. A commutator for a dynamoelectric machine having a plurality of commutator segments, each segment shaped to provide a longitudinally extending recess on each of its inner faces, a plurality of pre-formed metallic retaining members each having a projection adjacent its outer edge, said projection being located between adjacent segments and interfitting with the recesses provided thereon, and insulation interposed between adjacent segments and between said segments and said retaining members, said retaining members being rotatable with the shaft of said dynamoelectric machine.

7. A commutator for a dynamoelectric machine having a plurality of commutator segments, each segment shaped to provide on one of its inner faces a longitudinally extending recess, a plurality of pre-formed metallic retaining members each having a projection adjacent its outer edge, said projection being located between adjacent segments and interfitting with the recess provided on one of said segments, and insulation interposed between adjacent segments and between said segments and said retaining members, said retaining members being rotatable with the shaft of said dynamoelectric machine, and said insulation having the properties characteristic of such a material when cured in situ, and said commutator having the characteristics of such a member when made by first assembling segments, interposed insulation and retaining members in a cylindrical formation and then securing said retaining members to a more central mass.

8. A commutator for a dynamoelectric machine having a plurality of commutator segments, each segment shaped to provide on each of its inner faces a longitudinally extending recess, a plurality of pre-formed metallic retaining members each having a projection adjacent its outer edge, said projection being located between alternate segments and interfitting with the recesses provided thereon, and insulation interposed between adjacent segments and between said segments and said retaining members, said retaining members being rotatable with the shaft of said dynamoelectric machine.

9. A commutator for a dynamoelectric machine having a plurality of commutator segments, each segment shaped to provide on at least one of its inner faces an axially extending recess, a plurality of pre-formed metallic retaining members each having a projection adjacent its outer edge interfitting and interlocking with at least one of said recesses, insulation interposed between said segments and between said segments and said retaining members, spaced annular rings welded to the inner edge of each of said retaining members, said annular rings being secured to a sleeve rotatable with the shaft of said dynamoelectric machine, and end flanges secured to said sleeve and adapted to yieldingly restrain said commutator segments from axial movement except as required for differential thermal expansion and contraction.

10. A commutator for a dynamoelectric machine having a plurality of commutator segments, each segment shaped to provide a longitudinally extending recess on at least one of its inner faces, a plurality of pre-formed metallic retaining members each having adjacent its outer edge a projection adapted to interfit with at least one of said longitudinally extending recesses, each of said metallic retaining members being provided at its inner edge with a plurality of transversely extending notches, and a cast metallic sleeve adapted to rotate with a rotatable member of said dynamoelectric machine, said sleeve having projections interlocking with said notches for retaining said retaining members.

11. A method of building up a commutator for a dynomoelectric machine comprising providing the individual commutator segments with a longitudinally extending recess on at least one inner face thereof, surrounding the inner edges and the ends of said segments with a layer of insulating material which extends into said recesses, assembling the segments and compressing the segments together with the interposed insulation peripherally in order to reduce the external diameter of the assembly, and then casting metallic material into the center of said assembly, said metallic material entering into said recesses to interfit and interlock said material with said segments, said insulating material being all the while interposed between said metallic material and said segments.

12. A method of building up a commutator for a dynamoelectric machine comprising providing the individual commutator segments each with at least one longitudinally extending recess, surrounding the inner faces of said segments with a layer of insulating material which extends into said recesses, providing a plurality of retaining members having at their outer edges projections which interfit and interlock with the recesses on said segments, assembling said segments and said retaining members interleaved therewith in a cylindrical formation, compressing the assembled segments, retaining members and interposed insulation peripherally in order to reduce the external diameter of the assembly and then securing the retaining members against outward radial movement and so that they will be rotatable with the shaft of said dynamoelectric machine.

13. A method of building up a commutator for a dynamoelectric machine comprising providing the individual commutator segments each with at least one longitudinally extending recess, surrounding the inner faces of said segments with a layer of insulating material which extends into said recesses, assembling the segments, providing a plurality of retaining members having at their outer edges projections which interfit and interlock with the recesses on said segments, compressing the assembled segments, retaining members and interposed insulation peripherally in order to reduce the external diameter of the assembly, securing the retaining members against outward radial movement by welding said members to annular rings located generally within said members, and fastening said rings so as to be rotatable with the shaft of said dynamoelectric machine.

14. A method of building up a commutator for a dynamoelectric machine comprising providing the individual commutator segments each with at least one longitudinally extending recess, surrounding the inner faces of said segments with a layer of insulating material which extends into said recesses, assembling the segments, providing a plurality of retaining members having at their outer edges projections which interfit and interlock with the recesses on said segments and at their inner edges circumferentially extending notches, compressing the assembled segments, retaining members and interposed insulation peripherally in order to reduce the external diameter of the assembly and then securing the retaining members against outward radial movement and so that they will be rotatable with the shaft of the dynamoelectric machine by casting a metallic shell within the assembly of said members.

A. A. POLLOCK.

REFERENCES CITED

The following references are of record in the file of this patent:

UNITED STATES PATENTS

| Number | Name | Date |
|---|---|---|
| 524,793 | Shaw | Aug. 21, 1894 |
| 1,006,673 | Parsons | Oct. 24, 1911 |

FOREIGN PATENTS

| Number | Country | Date |
|---|---|---|
| 196,726 | Great Britain | May 3, 1923 |
| 307,451 | Germany | Aug. 31, 1918 |
| 516,390 | Germany | Jan. 22, 1931 |